US009115767B2

United States Patent
Wakabayashi et al.

(10) Patent No.: US 9,115,767 B2
(45) Date of Patent: Aug. 25, 2015

(54) CLUTCH COVER ASSEMBLY

(75) Inventors: Hirokazu Wakabayashi, Neyagawa (JP); Norihiko Tanigawa, Suzuka (JP); Nobuhiko Matsumoto, Neyagawa (JP)

(73) Assignee: EXEDY Corporation, Osaka (JP)

( * ) Notice: Subject to any disclaimer, the term of this patent is extended or adjusted under 35 U.S.C. 154(b) by 123 days.

(21) Appl. No.: 13/817,122

(22) PCT Filed: Aug. 4, 2011

(86) PCT No.: PCT/JP2011/067870
§ 371 (c)(1),
(2), (4) Date: Feb. 14, 2013

(87) PCT Pub. No.: WO2012/023441
PCT Pub. Date: Feb. 23, 2012

(65) Prior Publication Data
US 2013/0140126 A1 Jun. 6, 2013

(30) Foreign Application Priority Data

Aug. 20, 2010 (JP) ................................. 2010-185103

(51) Int. Cl.
*F16D 13/75* (2006.01)
(52) U.S. Cl.
CPC .................................... *F16D 13/757* (2013.01)
(58) Field of Classification Search
CPC ........... F16H 37/02; F16H 37/08; F16H 3/72; F16D 13/757
USPC ................. 192/3.28, 70.251, 70.252, 111.18, 192/111.2
See application file for complete search history.

(56) References Cited

U.S. PATENT DOCUMENTS

| 4,924,991 | A | * | 5/1990 | Takeuchi | ................. | 192/70.252 |
| 6,264,019 | B1 | * | 7/2001 | Uehara | .................... | 192/111.19 |
| 6,588,565 | B1 | * | 7/2003 | Maucher | ................. | 192/70.252 |
| 8,042,673 | B2 | * | 10/2011 | Adams | ..................... | 192/70.252 |
| 2004/0238307 | A1 | * | 12/2004 | Vogt et al. | .................... | 192/48.8 |

FOREIGN PATENT DOCUMENTS

| JP | 63-270925 A | 11/1988 |
| JP | 03-53628 U | 5/1991 |
| JP | 10-227317 A | 8/1998 |
| JP | 2000-179570 A | 6/2000 |
| JP | 2003-28193 A | 1/2003 |

* cited by examiner

*Primary Examiner* — Rodney H Bonck
*Assistant Examiner* — Stacey Fluhart
(74) *Attorney, Agent, or Firm* — Global IP Counselors, LLP

(57) ABSTRACT

A clutch cover assembly is equipped with a clutch cover that is fixed to a flywheel, a pressure plate, a diaphragm spring, an wear-amount detecting mechanism, and a wear tracking mechanism. The wear-amount detecting mechanism has a contact member, an opposing member, and a wedge member. The contact member is attached to the pressure plate and is in contact with the flywheel. The opposing member is attached to the contact member and opposes the pressure plate. The wedge member fits between the opposing member and the pressure plate and moves in a circumferential direction in accordance with the wear-amount of a friction member. The wear tracking mechanism moves the pressing member to an initial posture side in accordance with the amount of movement of the wedge member.

6 Claims, 6 Drawing Sheets

CLUTCH COVER ASSEMBLY

CROSS-REFERENCE TO RELATED APPLICATIONS

This U.S. national phase application claims priority to Japanese Patent Application No. 2010-185103 filed on Aug. 20, 2010. The entire disclosure of Japanese Patent Application No. 2010-185103 is hereby incorporated herein by reference.

BACKGROUND

1. Technical Field

The present invention relates to a clutch cover assembly and particularly a clutch cover assembly for pressing a friction member of a clutch disc assembly against a flywheel of an engine and releasing the pressing.

2. Background Art

A clutch cover assembly is generally attached to a flywheel of an engine and used for transmitting the driving force of the engine to a transmission side. The clutch cover assembly is mainly equipped with a clutch cover, a pressure plate, and a diaphragm spring. The clutch cover is fixed to the flywheel. The pressure plate is pressed to the flywheel side by the diaphragm spring and holds a friction member of a clutch disc assembly with and the flywheel. The diaphragm spring has the function of pressing the pressure plate and also has a lever function for releasing the pressing on the pressure plate.

Here, when the wear of the friction member of the clutch disc assembly advances due to the load characteristic of the diaphragm spring, the pressing load on the friction member becomes greater. For this reason, when the friction member wears, a large load becomes necessary to perform the release operation, and the clutch pedal pressure ends up becoming greater.

Thus, as described in patent citation 1 for example, there has been proposed a wear compensating mechanism that is configured to suppress the pressing load from becoming greater by returning the posture of the diaphragm spring to an initial state even in a case where the friction member has worn. The wear compensating mechanism mainly has a fulcrum ring that is placed between the pressure plate and the diaphragm spring, a biasing mechanism that biases the fulcrum ring in a direction away from the pressure plate, and a wear-amount detecting mechanism that detects the wear-amount of the friction member. Here, the diaphragm spring is capable of pressing the pressure plate via the fulcrum ring, and by moving the fulcrum ring to the side away from the pressure plate in accordance with the wear-amount of the friction member, the diaphragm spring is maintained in its initial set posture.

Further, in order to remedy instability in the operation of the wear-amount detecting mechanism caused by vibration, the wear compensating mechanism described in patent citation 2 has also been proposed. Here, a cone spring for absorbing vibration is disposed in the wear-amount detecting mechanism to stabilize the operation for wear compensation.

CITATION LIST

Patent Literature
Patent citation 1: JP-A No. 10-227317
Patent citation 2: JP-A No. 2003-28193

SUMMARY

Technical Problem

In the wear compensating mechanisms described above, precisely detecting the wear-amount is important. In patent citations 1 and 2, the wear-amount detecting mechanisms are configured by a bush and a bolt that penetrates the bush, and the wear-amount is detected by the interstice between both that arises in accordance with wear. However, in the well-known configurations described above, there is the concern that the interstice indicating the wear-amount will change due to vibration of each portion accompanying the engine vibration or the like, and stably performing accurate wear compensation is difficult.

It is a problem to stabilize the operation of a wear-amount detecting mechanism and make it possible to perform wear compensation that is always accurate.

Solution to Problem

A clutch cover assembly pertaining to claim 1 is for pressing a friction member of a clutch disc assembly against a flywheel of an engine and releasing the pressing.

The clutch cover assembly is equipped with a clutch cover that is fixed to the flywheel, a pressure plate, a pressing member, a wear-amount detecting mechanism, and a wear tracking mechanism. The pressure plate is a member for pressing the friction member against the flywheel and is coupled to the clutch cover in such a way as to be relatively non-rotatable with respect to the clutch cover. The pressing member is a member for pressing the pressure plate to the flywheel side and is supported on the clutch cover. The wear-amount detecting mechanism has a contact member, an opposing member, and a wedge member. The contact member is attached to the pressure plate and is in contact with the flywheel. The opposing member is attached to the contact member and opposes the pressure plate. The wedge member fits between the opposing member and the pressure plate and moves in a circumferential direction in accordance with the wear-amount of the friction member. The wear tracking mechanism moves the pressing member to an initial posture side in accordance with the amount of movement of the wedge member.

In this clutch cover assembly, the wear-amount of the friction member is detected by the wear-amount detecting mechanism. In the wear-amount detecting mechanism, the wedge member fits between the opposing member attached to the contact member and the pressure plate in a state in which the contact member attached to the pressure plate is in contact with the flywheel. Additionally, the wedge member moves in the circumferential direction in accordance with the wear-amount of the friction member. That is, the wedge member moves in the circumferential direction in accordance with the wear-amount of the friction member and is held in the state in which it fits between the opposing member and the pressure plate. In this way, in the present invention, the wedge member is held in the state in which it fits between the opposing member and the pressure plate. Therefore, even if vibration or the like occurs, the wear-amount can be accurately detected. That is, the wear-amount detecting mechanism can be stably operated and wear compensation that is always accurate can be performed.

A clutch cover assembly pertaining to claim 2 is the clutch cover assembly of claim 1, wherein the wear-amount detecting mechanism further has a first biasing member that biases the wedge member in the circumferential direction. First sliding portions that are in contact with and slide against each other are formed on the opposing member and the wedge member. First sloping surfaces that slope along the circumferential direction are formed on the first sliding portions. In a state in which the first sloping surface of the wedge member has been brought into contact with the first sloping surface of the opposing member by the biasing force of the first biasing member, the first biasing member moves the wedge member in the circumferential direction in accordance with the wear-amount of the friction member.

In this clutch cover assembly, the first sloping surface of the wedge member is brought into contact with the first sloping surface of the opposing member by the biasing force of the first biasing member. Further, in this state, the first biasing member moves the wedge member in the circumferential direction in accordance with the wear-amount of the friction member. In this way, in the present invention, the wedge member can be reliably held between the opposing member and the pressure plate by the first biasing member. Because of this, it becomes difficult for the wedge member to go out of position due to vibration or the like, so the wear-amount detecting mechanism can be stably operated and wear compensation that is always accurate can be performed.

A clutch cover assembly pertaining to claim 3 is the clutch cover assembly according to claim 2, wherein the wedge member maintains its fitting with the opposing member by moving in a direction away from the opposing member together with the pressure plate in accordance with the wear-amount of the friction member and moving in the circumferential direction due to the first biasing member.

In this clutch cover assembly, when the friction member wears, the pressure plate moves in the direction away from the opposing member. Then, the wedge member moves in the direction away from the opposing member together with the pressure plate and also moves in the circumferential direction due to the biasing force of the first biasing member. In this way, in the present invention, when the friction member wears and an interstice arises between the wedge member and the opposing member, the wedge member immediately fits between the opposing member and the pressure plate in such a way as to fill the interstice. Therefore, it becomes difficult for the wedge member to be affected by vibration or the like and the wear-amount can be accurately detected. That is, the wear-amount detecting mechanism can be stably operated and wear compensation that is always accurate can be performed.

A clutch cover assembly pertaining to claim 4 is the clutch cover assembly according to any of claims 1 to 3, wherein the wear tracking mechanism has a fulcrum ring, second sliding portions, and a second biasing member. The fulcrum ring is supported, in such a way that it can freely move in an axial direction, on the pressure plate and is pressed to the pressure plate side by the pressing member. The second sliding portions are formed on the pressure plate and the fulcrum ring and are in contact with and slide against each other. The second biasing member biases the fulcrum ring in the circumferential direction and relatively rotates the fulcrum ring with respect to the pressure plate. In this wear tracking mechanism, second sloping surfaces that slope along the circumferential direction are formed on the second sliding portions. Further, the second biasing member moves the fulcrum ring in a direction away from the pressure plate by rotating the fulcrum ring in accordance with the amount of movement of the wedge member.

In this clutch cover assembly, the fulcrum ring is relatively rotated with respect to the pressure plate by the second biasing member only an amount corresponding to the amount of movement of the wedge member—that is, the wear-amount of the friction member. The fulcrum ring and the pressure plate are in contact at the second sliding portions including the second sloping surfaces, so when the fulcrum ring is rotated with respect to the pressure plate, the fulcrum ring moves to the side away from the pressure plate. Because of this, even when the friction member wears, the position at which the fulcrum ring supports the pressing member does not change from the initial posture. For this reason, the pressing load characteristic, and therefore the release load characteristic, can be maintained in the initial state.

A clutch cover assembly pertaining to claim 5 is the clutch cover assembly according to claim 4, wherein the second sloping surfaces of the second sliding portions are formed in such a way that the angle of inclination of the second sloping surfaces of the second sliding portions is greater than the angle of inclination of the first sloping surfaces of the first sliding portions. The first sliding portions are sections that are formed on the opposing member and the wedge member and are in contact with and slide against each other. The second sliding portions are sections that are formed on the pressure plate and the fulcrum ring and are in contact with and slide against each other.

In this clutch cover assembly, the angle of inclination of the second sloping surfaces of the second sliding portions formed on the pressure plate and the fulcrum ring is greater than the angle of inclination of the first sloping surfaces formed on the opposing member and the wedge member. Therefore, the fulcrum ring can be regulated from moving in its former direction due to vibration or the like. Because of this, under-adjustment of the fulcrum ring can be reliably prevented.

A clutch cover assembly pertaining to claim 6 is the clutch cover assembly according to any of claims 1 to 5, wherein concavo-convex portions that engage with each other are formed on the wedge member and the pressure plate. Additionally, when the wear-amount of the friction member has reached a predetermined wear-amount, the engagement between the concavo-convex portion of the wedge member and the concavo-convex portion of the pressure plate is released and the concavo-convex portion of the wedge member engages with the concavo-convex portion of the pressure plate adjacent in the circumferential direction.

In this clutch cover assembly, when the wear-amount of the friction member has reached the predetermined wear-amount, the concavo-convex portion of the wedge member engages with the concavo-convex portion of the pressure plate adjacent in the circumferential direction. Therefore, the wedge member can be held between the opposing member and the pressure plate, and the wedge member can be regulated in such a way that it does not move in its former direction due to vibration or the like. In this way, in the present invention, the wear-amount detecting mechanism can be stably operated and wear compensation that is always accurate can be performed.

DETAILED DESCRIPTION OF THE PREFERRED EMBODIMENT

Overall Configuration

Figure 1:
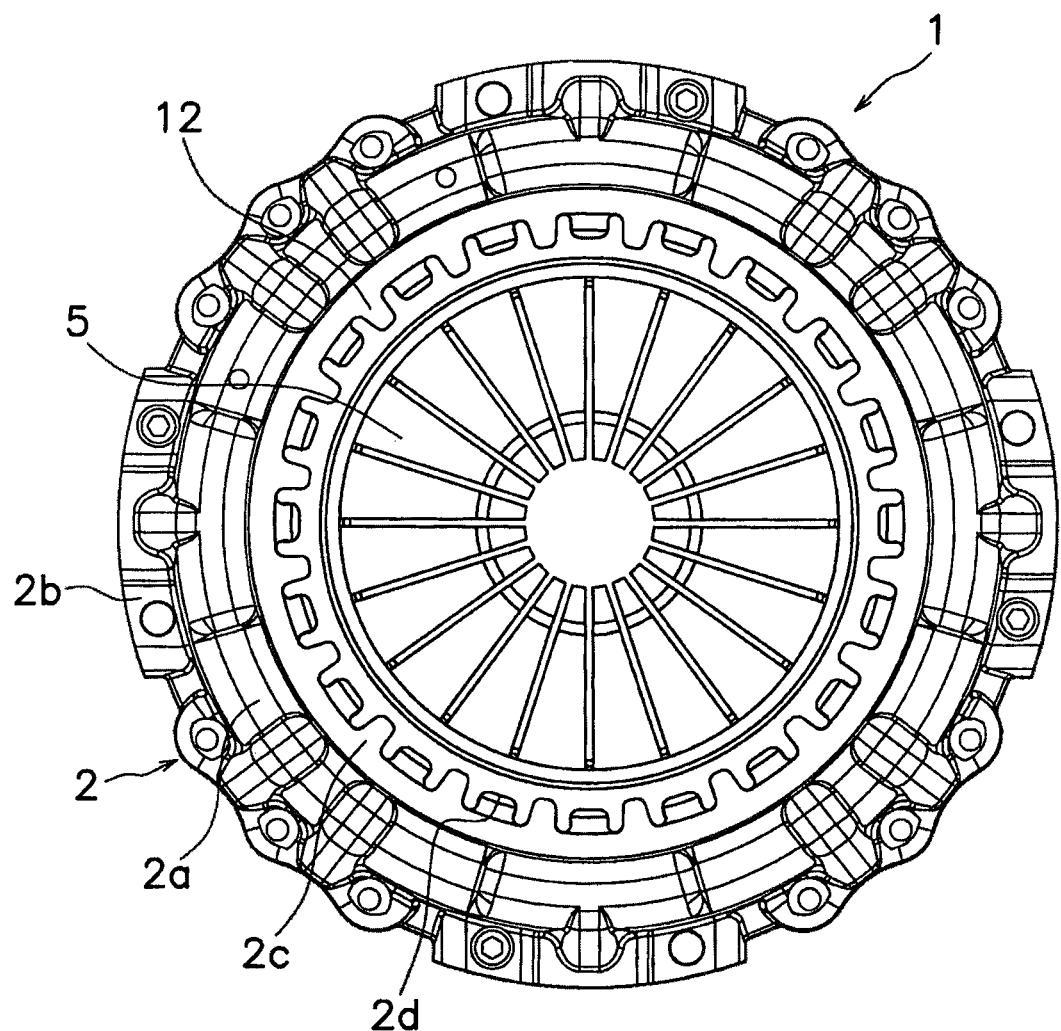
FIG. 1 is a front view of a clutch cover assembly pertaining to an embodiment of the present invention.
Figure 2:
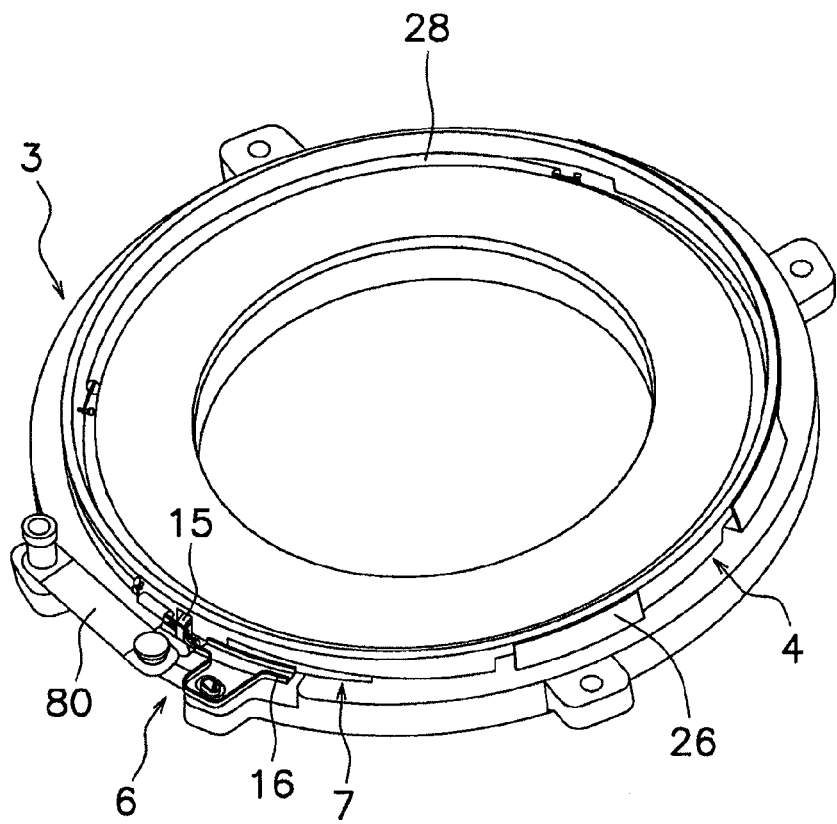
FIG. 2 is an exploded perspective view of the clutch cover assembly.

FIG. 1 shows a front view of a clutch cover assembly 1 according to an embodiment of the present invention. Further, FIG. 2 shows an external perspective view in which part of the clutch cover assembly 1 is omitted. The clutch cover assembly 1 is a device for pressing a friction member of a clutch disc assembly against a flywheel of an engine at a time when the clutch is on (power is transmitted) and releasing the pressing at a time when the clutch is off (the transmission of power is cut off). Here, the flywheel and the clutch disc assembly are omitted.

The clutch cover assembly 1 is mainly configured from a clutch cover 2, a pressure plate 3, plural segments of the fulcrum ring 4, a diaphragm spring 5, a wear-amount detecting mechanism 6, and a wear tracking mechanism 7 that includes the plural segments of the fulcrum ring 4.

Clutch Cover

The clutch cover 2 is a generally dish-shaped plate member, and its outer peripheral portion is fixed to the flywheel by bolts, for example. The clutch cover 2 has an annular clutch cover body 2a, a disc-shaped portion 2b on the outer peripheral side, and a flat portion 2c on the inner peripheral side. The disc-shaped portion 2b is formed on the outer peripheral side of the clutch cover body 2a and is fixed to the outer peripheral portion of the flywheel. The flat portion 2c is a flat section that extends inward in the radial direction from the inner peripheral portion of the clutch cover body 2a. Plural holes 2d that penetrate the flat portion 2c in the axial direction are formed in the flat portion 2c.

Pressure Plate

The pressure plate 3 is an annular member and is placed inside the clutch cover body 2a of the clutch cover 2. On the surface on the flywheel side (the reverse side in FIG. 2) of the pressure plate 3, a friction surface (not shown in the drawings) that slidingly contacts the friction member of the clutch disc assembly is formed. Further, the pressure plate 3 is coupled to the clutch cover 2 by plural strap plates 80 (see FIG. 2; just one is shown in FIG. 2), is movable in the axial direction with respect to the clutch cover 2, and is relatively non-rotatable in the circumferential direction with respect to the clutch cover 2. In a state in which the clutch is coupled, the strap plates bend in the axial direction, and the pressure plate 3 is biased to the side away from the flywheel by the bending (resilience) of the strap plates.

Figure 3:
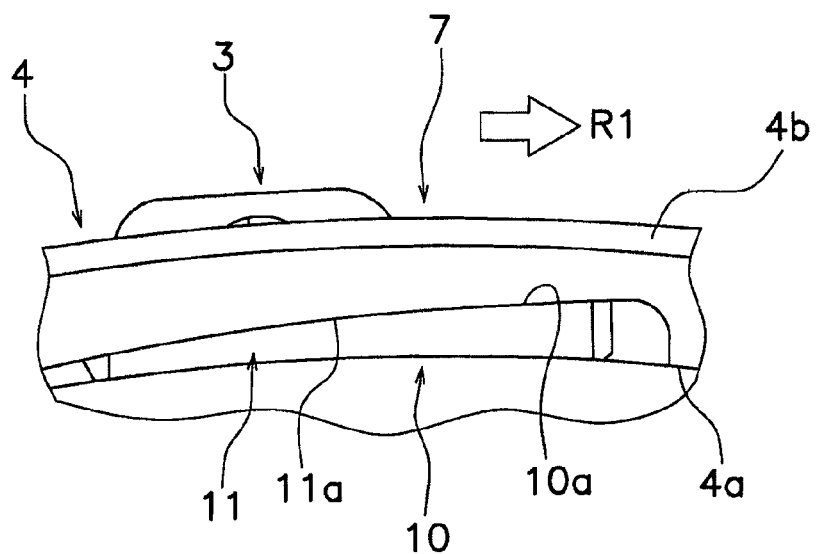
FIG. 3 is a partially enlarged view of a pressure plate and a fulcrum ring.
Figure 4:
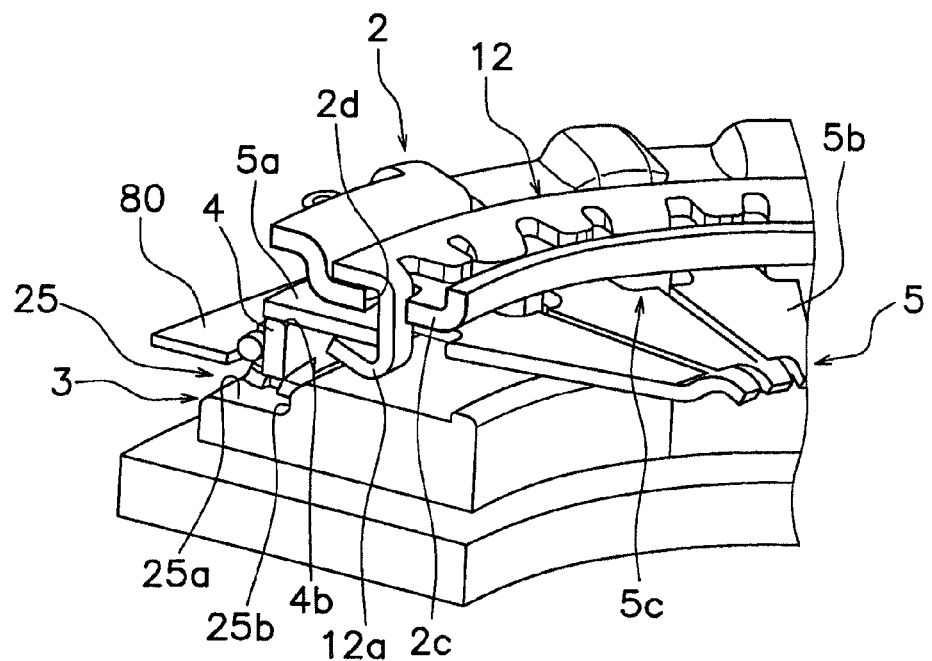
FIG. 4 is a partial cross-sectional perspective view showing a support structure of a diaphragm spring.

Further, on the surface on the transmission side (the front side in FIG. 2) of the pressure plate 3, as shown in FIG. 3, sliding portions 10 are formed in plural places in the circumferential direction on the outer peripheral side. Specifically, each sliding portion 10 is formed projecting outward in the axial direction from a bottom portion 25a of a step portion 25 described later. Each sliding portion 10 has a sloping surface 10a that slopes in such a way that its height becomes higher in a first circumferential direction (the direction of R1 in FIG. 3). Further, as shown in FIG. 4, on the surface on the transmission side of the pressure plate 3, the step portion 25 is formed in the circumferential direction on the outer peripheral side. Further, on the surface on the transmission side of the pressure plate 3, guide portions 26 are formed in plural places in the circumferential direction on the outer peripheral side (see FIG. 2). The guide portions 26 are formed on the pressure plate 3 in such a way as to oppose a wall portion 25b of the step portion 25.

Figure 5:
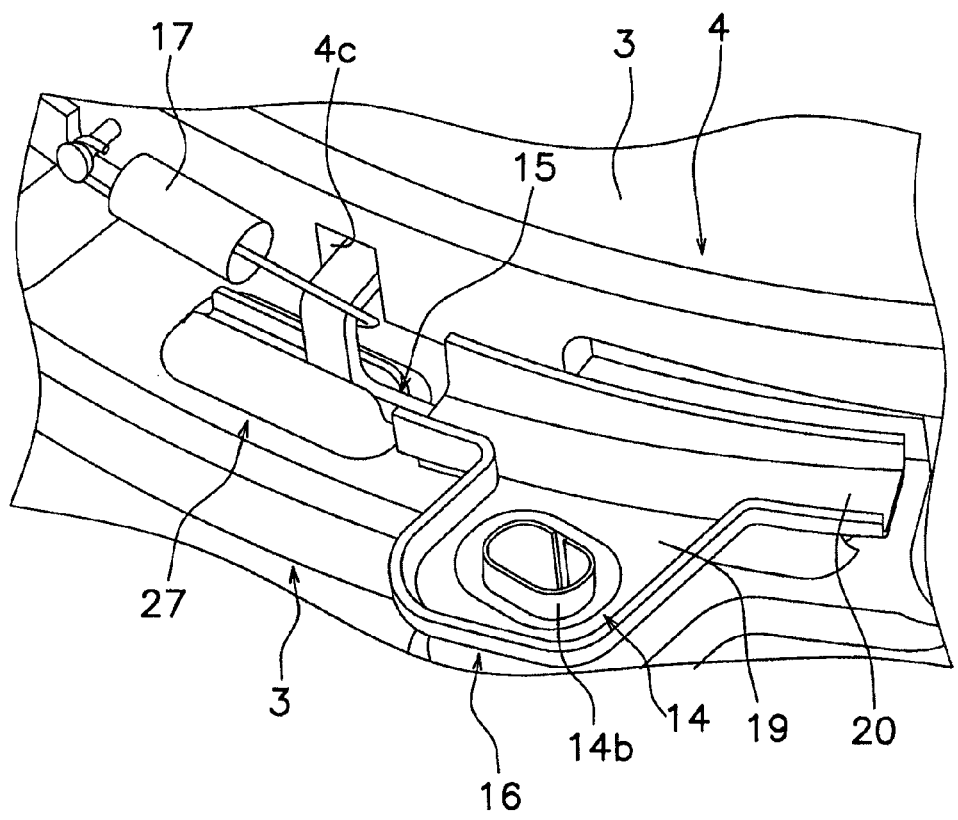
FIG. 5 is an enlarged perspective view of a wear-amount detecting mechanism.
Figure 6:
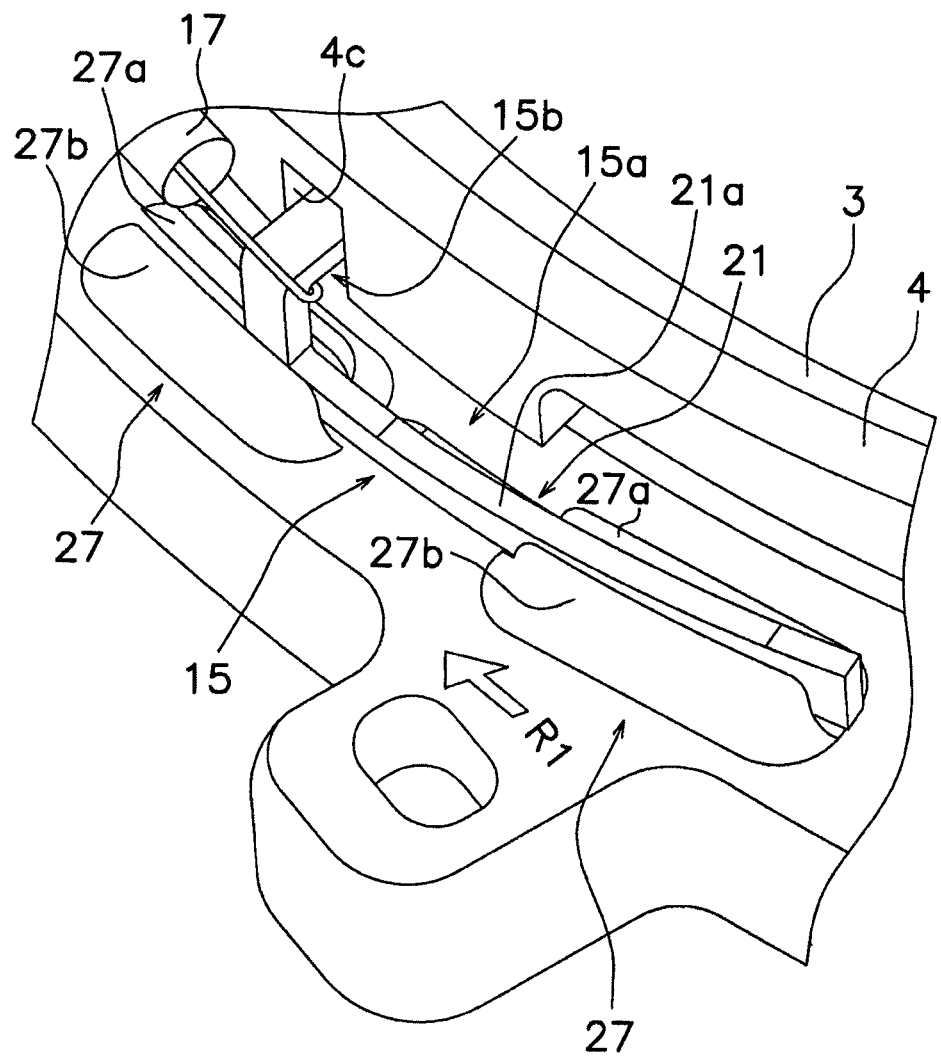
FIG. 6 is an enlarged perspective view of the wear-amount detecting mechanism excluding an opposing member.

Moreover, as shown in FIG. 5 and FIG. 6, plural rail portions—for example, two sets of rail portions—27 are disposed on the pressure plate 3. Each set of rail portions 27 has a pair of two projecting portions 27a and 27b that are formed opposing each other. The two projecting portions 27a and 27b in each pair are disposed on the pressure plate 3 in positions a predetermined interval apart from each other. A wedge member 15 described later is placed between the two projecting portions 27a and 27b in each pair.

Fulcrum Ring

The plural segments of the fulcrum ring 4 are circular arc-shaped members, that is, members formed by dividing an annular member in the circumferential direction. As shown in FIG. 3 and FIG. 4, an axial-direction first end side 4a (the flywheel side) of the plural segments of the fulcrum ring 4 is placed on the bottom portion 25a of the step portion 25 of the pressure plate 3. More specifically, the plural segments of the fulcrum ring 4 are placed on the bottom portion 25a of the step portion 25 between the wall portion 25b of the step portion 25 of the pressure plate 3 and the guide portions 26.

Further, as is apparent from FIG. 3, sliding portions 11 are formed in plural places in the circumferential direction on the first end 4a of the fulcrum ring 4. The sliding portions 11 have sloping surfaces 11a. The sloping surfaces 11a are in contact with the sloping surfaces 10a of the sliding portions 10 formed on the bottom portion 25a of the step portion 25 of the pressure plate 3 and slope in such a way that their height becomes lower in the first circumferential direction (the direction of R1 in FIG. 3). Further, as shown in FIG. 5, an engaging recessed portion 4c with which the wedge member 15 described later engages is formed in the fulcrum ring 4. Specifically, the engaging recessed portion 4c is a section that has been cut out in the shape of a groove in the radial direction in the first end 4a of the fulcrum ring 4. The engaging recessed portion 4c has a width W1 in the circumferential direction.

Here, an annular member is formed by arranging the plural segments of the fulcrum ring 4 (circular arc-shaped members) one after another, but a single annular member can also be used as the fulcrum ring.

Diaphragm Spring

As shown in FIG. 1 and FIG. 4, the diaphragm spring 5 is a disc-shaped member placed between the pressure plate 3 and the clutch cover 2. The diaphragm spring 5 is configured from an annular elastic portion 5a and plural lever portions 5b that extend inward in the radial direction from the inner peripheral portion of the annular elastic portion 5a. The outer peripheral end of the annular elastic portion 5a is supported on a second end 4b of the fulcrum ring 4. Further, slits are formed between the lever portions 5b of the diaphragm spring 5, and oval holes 5c are formed in the outer peripheral portions of the slits.

A push-type release device (not shown in the drawings) is in contact with the distal ends of the lever portions 5b of the diaphragm spring 5. The release device is a device for moving the distal ends of the lever portions 5b of the diaphragm spring 5 in the axial direction to thereby release the biasing force on the pressure plate 3 resulting from the diaphragm spring 5.

Further, as shown in FIG. 4, the diaphragm spring 5 is supported on the clutch cover 2 by a support member 12. The support member 12 is a ring-shaped plate member placed on the surface on the transmission side of the flat portion 2c of the clutch cover 2. Plural support projections 12a that extend inward in the radial direction are formed on the inner peripheral portion of the support member 12. The plural support projections 12a are bent to the pressure plate 3 side, and the bent portions are inserted through plural through holes 2d formed in the flat portion 2c of the clutch cover 2. Further, the bent portions inserted through the through holes 2d are further inserted through the oval holes 5c in the diaphragm spring 5. Additionally, the distal ends of the support projections 12a are bent toward the outer peripheral side and support the diaphragm spring 5 with respect to the clutch cover 2.

Wear-Amount Detecting Mechanism

As shown in FIG. 2 and FIG. 5 to FIG. 7, the wear-amount detecting mechanism 6 is placed on the outer peripheral portion of the fulcrum ring 4. The wear-amount detecting mechanism 6 is a mechanism that detects the wear-amount of the friction member configuring the clutch disc assembly. The wear-amount detecting mechanism 6 has a roll pin 14, an opposing member 16, the wedge member 15, and a first coil spring 17.

Figure 7:
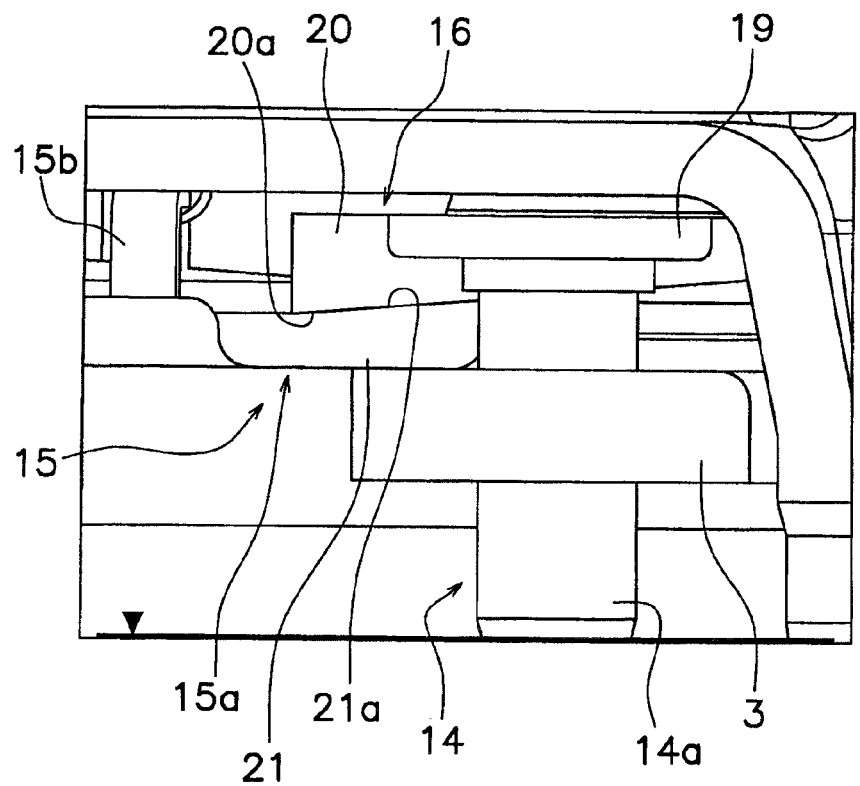
FIG. 7 is a view showing the configuration of the wear-amount detecting mechanism.

The roll pin 14 is a member in contact with the flywheel. As shown in FIG. 7, the roll pin 14 is attached, in such a way that it can freely slide, in an attachment hole formed in the pressure plate 3. A first end 14a of the roll pin 14 is in contact with the flywheel (see FIG. 7), and a second end 14b of the roll pin 14 is press-fitted in and attached to the opposing member 16 (see FIG. 5). The roll pin 14 always keeps the distance between the opposing member 16 and the flywheel at a constant by bringing the first end 14a into contact with the flywheel. The flywheel surface is indicated by a triangular symbol (the "▼" symbol) in FIG. 7.

As shown in FIG. 5 and FIG. 7, the opposing member 16 has an attachment portion 19, which is for attaching the roll pin 14, and an opposing member-use sliding portion 20, which becomes a reference when detecting the wear-amount of the friction member and is in contact with and slides against a sliding portion 21 (described later) of the wedge member 15. The second end 14b of the roll pin 14 is press-fitted in and attached to the attachment portion 19 that is a boss portion, for example. Further, in a state in which the second end 14b of the roll pin 14 has been attached to the boss portion 19 and the first end 14a of the roll pin 14 is in contact with the flywheel, the sliding portion 20 is placed opposing the pressure plate 3. In this way, the position of the opposing member 16 is always kept at a constant by the roll pin 14 in contact with the flywheel. The sliding portion 20 has a sloping surface 20a that slopes in such a way that its height becomes higher in the first circumferential direction (the direction of R1 in FIG. 3).

The wedge member 15 is a member that fits between the opposing member 16 and the pressure plate 3 (see FIG. 7), and the wedge member 15 moves in the first circumferential direction (the direction of R1 in FIG. 3 and FIG. 6) in accordance with the wear-amount of the friction member. Specifically, the wedge member 15 moves in the first circumferential direction due to the first coil spring 17 while moving in a direction away from the opposing member 16 together with the pressure plate 3 in accordance with the wear-amount of the friction member. Because of this, the wedge member 15 fits between the pressure plate 3 and the opposing member 16, and stops moving in the first circumferential direction.

As shown in FIG. 6 and FIG. 7, the wedge member 15 has a body portion 15a and an engaging portion 15b that is formed integrally with the body portion 15a and engages with the fulcrum ring. The body portion 15a is a section formed in the shape of a rod and is placed in the two rail portions 27 formed on the pressure plate 3. Specifically, the body portion 15a is placed in such a way that it can freely move in the circumferential direction between each pair of the two projecting portions 27a and 27b. The sliding portion 21 (first sliding portion) that is in contact with and slides against the sliding portion 20 of the opposing member 16 is formed on the body portion 15a. The wedge member-use sliding portion 21 has a sloping surface 21a that slopes in such a way that its height becomes lower in the first circumferential direction (the direction of R1 in FIG. 3).

Here, the sloping surface 20a of the opposing member 16 and the sloping surface 21a of the wedge member 15 are formed in such a way that the angle of inclination of the sloping surfaces 20a and 21a formed on the opposing member 16 and the wedge member 15 respectively is smaller than the angle of inclination of the sloping surfaces 10a and 11a formed on the pressure plate and the fulcrum ring 4 respectively. In other words, the sloping surfaces 10a of the pressure plate and the sloping surfaces 11a of the fulcrum ring 4 are formed in such a way that the angle of inclination of the sloping surfaces 10a and 11a formed on the pressure plate and the fulcrum ring 4 respectively is greater than the angle of inclination of the sloping surfaces 20a and 21a formed on the opposing member 16 and the wedge member 15 respectively.

It is preferred that the angle of inclination of the sloping surfaces 10a and 11a of the pressure plate and the fulcrum ring 4 respectively be set to less than 6.0 degrees, for example. Here, the angle of inclination of the sloping surfaces 10a and 11a is set to 5.6 degrees, for example. Further, it is preferred that the angle of inclination of the sloping surfaces 20a and 21a of the opposing member 16 and the wedge member 15 respectively be set to less than 5.6 degrees, for example. Here, the angle of inclination of the sloping surfaces 20a and 21a is set to 5.5 degrees, for example.

Figure 8:
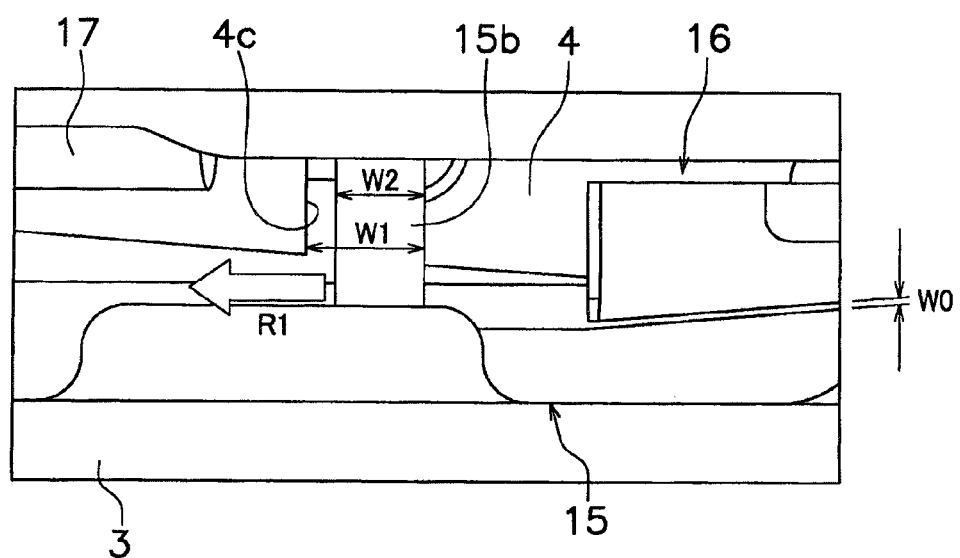
FIG. 8 is a view for describing the actions of the wear-amount detecting mechanism and a wear tracking mechanism.
Figure 9:
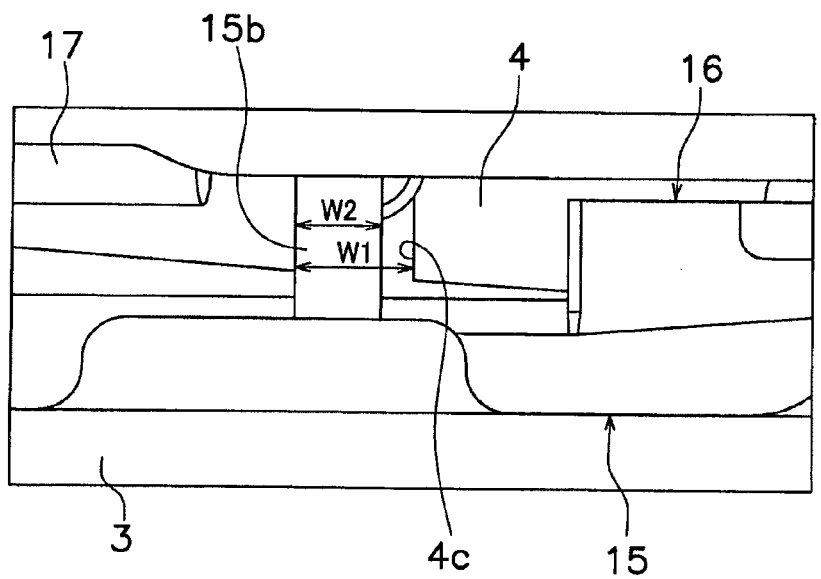
FIG. 9 is a view for describing the actions of the wear-amount detecting mechanism and the wear tracking mechanism.

As shown in FIG. 6, the engaging portion 15b is integrally formed projecting in a direction intersecting the lengthwise direction of the body portion 15a. The engaging portion 15b is formed in the shape of an L, and its distal end portion engages with the engaging recessed portion 4c of the fulcrum ring 4. Specifically, the distal end portion of the engaging portion 15b is inserted into the engaging recessed portion 4c of the fulcrum ring 4, and the body portion 15a is put in the rail portions 27. The distal end portion of the engaging portion 15b has a width W2 in the circumferential direction. As shown in FIG. 8 and FIG. 9, the width W2 of the distal end portion of the engaging portion 15b is smaller than the width W1 of the engaging recessed portion 4c. The engaging portion 15b (that is, the wedge member 15) is movable in the circumferential direction in the range of (W1−W2). For example, the engaging recessed portion 4c and the engaging portion 15b are formed in such a way that the difference between the width W1 of the engaging recessed portion 4c and the width W2 of the distal end portion of the engaging portion 15b is a predetermined value such as 2.0 mm, for example.

The first coil spring 17 is a member that biases the wedge member 15 in the first circumferential direction. In other words, the first coil spring 17 is a member that regulates the movement of the wedge member 15 in a second circumferential direction (the opposite direction of the direction of R1). As shown in FIG. 5, one end of the first coil spring 17 is attached to the engaging portion 15b of the wedge member 15, and the other end of the first coil spring 17 is attached to the fulcrum ring 4. The first coil spring 17 biases, in the first circumferential direction (the direction of R1 in FIG. 6), the wedge member 15 placed between the pressure plate 3 and the opposing member 16. Because of this, the wedge member 15 is maintained in the state in which it is fitted between the pressure plate 3 and the opposing member 16. Additionally, when the friction member has worn, the first coil spring 17 moves the wedge member 15 in the first circumferential direction and wedges the wedge member 15 between the pressure plate 3 and the opposing member 16 in accordance with the wear-amount of the friction member Wear Tracking Mechanism The wear tracking mechanism 7 is a mechanism for tracking the wear-amount of the friction member—that is, the amount of movement of the wedge member 15—to keep the posture of the diaphragm spring 5 in an initial posture. The wear tracking mechanism 7 has, in addition to the plural segments of the fulcrum ring 4, the sliding portions 10 and 11 formed on the pressure plate 3 and the fulcrum ring 4 respectively and a second coil spring 28 (see FIG. 2).

The plural segments of the fulcrum ring 4 are placed, in such a way as to be relatively rotatable with respect to the pressure plate 3, between the wall portion 25b of the step portion 25 of the pressure plate 3 and the guide portions 26. Further, the plural segments of the fulcrum ring 4 are pressed to the pressure plate 3 side by the diaphragm spring 5. Further, in the state of FIG. 9, the sloping surfaces 11a of the sliding portions 11 of the plural segments of the fulcrum ring 4 are in contact with the sloping surfaces 10a of the sliding portions 10 of the pressure plate 3, and the plural segments of the fulcrum ring 4 are movable in the first circumferential direction (the direction of R1 in FIG. 6) only an amount equal to the amount of movement of the wedge member 15. Here, the maximum value of the amount of movement of the wedge member 15 is (W1−W2).

The second coil spring 28 is a member that biases the fulcrum ring 4 in the first circumferential direction. In other words, the second coil spring 28 is a member that regulates the movement of the fulcrum ring 4 in the second circumferential direction (the opposite direction of the direction of R1). The second coil spring 28 relatively rotates the fulcrum ring 4 in the first circumferential direction with respect to the pressure plate. As shown in FIG. 2, the second coil spring 28 is attached to the fulcrum ring 4 and the pressure plate 3 in such a way as to be along the inner peripheral portion of the fulcrum ring 4. Specifically, one end of the second coil spring 28 is attached to the fulcrum ring 4, and the other end of the second coil spring 28 is attached to the pressure plate 3.

In the configuration described above, in a case where the wedge member 15 has moved in the circumferential direction (the direction of R1) in accordance with the wear-amount of the friction member, the fulcrum ring 4 is capable of rotational movement only an amount equal to the amount of movement of the wedge member 15. Additionally, when the fulcrum ring 4 rotates with respect to the pressure plate 3, the fulcrum ring 4 moves to the side away from the pressure plate 3 in the axial direction because both members 4 and 3 are in contact with each other due to the sloping surfaces of the sliding portions 10 and 11.

Wear-Amount Detecting Action and Wear Tracking Action

In a state in which the clutch is on (coupled), the pressing load of the diaphragm spring 5 acts on the pressure plate 3 via the fulcrum ring 4, and because of this, the friction member of the clutch disc assembly is held between the pressure plate 3 and the flywheel. At this time, as shown in FIG. 7, the wedge member 15 is fitted between the pressure plate 3 and the opposing member 16.

When the friction member wears, the thickness of the friction member becomes thinner, and therefore the pressure plate 3 moves to the flywheel side (the lower side in FIG. 7 and FIG. 8). Further, because the wedge member 15 is supported on the pressure plate 3, the wedge member 15 moves to the flywheel side together with the pressure plate 3 in accompaniment with the movement of the pressure plate 3. Then, an interstice W0 (see FIG. 8) corresponding to the wear-amount of the friction member arises between the wedge member 15 and the pressure plate 3. Then, the wedge member 15 moves in the direction in which it fills the interstice W0—that is, the direction of R1 in FIG. 8—due to the biasing force of the first coil spring 17.

In this way, in accordance with the wear-amount of the friction member, the wedge member 15 moves in the direction of R1 and, as shown in FIG. 9, is fitted between the pressure plate 3 and the opposing member 16. That is, the engagement between the wedge member 15 and the opposing member 16 is temporarily released by the wear of the friction member, but the wedge member 15 moves due to the biasing force of the first coil spring 17 and reengages with the opposing member 16. Because of this, even when the friction member has worn, the interval between the pressure plate 3 and the opposing member 16 is always kept at a constant by the movement of the wedge member 15.

In FIG. 9, an example of a case where the side end surface of the engaging portion 15b of the wedge member 15 is striking the wall surface on one side of the engaging recessed portion 4c—that is, an example of a case where the wedge member 15 has moved only the maximum value (W1−W2) of the amount of movement of the wedge member 15 and stopped—is shown. However, in a case where the wear-amount of the friction member is small, the wedge member 15 is fitted between the pressure plate 3 and the opposing member 16 and the interval between the pressure plate 3 and the opposing member 16 is held at a constant in a state between FIG. 8 and FIG. 9—that is, a state in which the engaging portion 15b of the wedge member 15 is not yet in contact with the wall surface of the engaging recessed portion 4c. In other words, the wedge member 15 is fitted between the pressure plate 3 and the opposing member 16 and the interval between the pressure plate 3 and the opposing member 16 is held at a constant in a state in which the engaging portion 15b of the wedge member 15 is positioned between the opposing wall surfaces of the engaging recessed portion 4c.

Next, after the wedge member 15 has moved, when a clutch release operation is performed so that the clutch is off (uncoupled), the pressing on the fulcrum ring 4 by the diaphragm spring 5 is released. Here, the fulcrum ring 4 rotates in the direction of R1 with respect to the pressure plate 3 because the fulcrum ring 4 is biased in the direction of R1 by the second coil spring 28. This rotation of the fulcrum ring 4 is stopped as a result of the wall surface of the engaging recessed portion 4c of the fulcrum ring 4 coming into contact with the side end surface of the engaging portion 15b of the wedge member 15. The state of FIG. 7 and FIG. 8 correspond to this state.

In this way, before the clutch release operation is performed, a movement of the wedge member 15 corresponding to the wear of the friction member is performed, and when the clutch release operation has been performed, the movement of the fulcrum ring 4 is performed. That is, in a state in which the clutch is on (a state in which the friction member is pressed against the flywheel), a preparation prior to the movement of the fulcrum ring 4—that is, detection of the wear of the friction member—is performed, and in a state in which the clutch is off (a state in which the pressing of the friction member is released from the flywheel), the movement of the fulcrum ring 4—that is, wear tracking—is performed.

Here, in order to facilitate description, an example of a case where the wedge member moves in accordance with the wear-amount W0 of the friction member is provided. However, this does not mean that the wedge member 15 moves in a stepwise manner; in the present embodiment, the wedge member 15 moves continuously, tracking the wear of the friction member.

Next, the respective sliding portions 10 and 11 (sloping surfaces) of the fulcrum ring 4 and the pressure plate 3 are in contact with each other, so when the fulcrum ring 4 rotates as described above, the fulcrum ring 4 moves in the direction away from the pressure plate 3. That is, the fulcrum ring 4 moves to the transmission side only an amount equal to the wear-amount of the friction member. Because of this movement, the fulcrum ring 4 returns to its initial position before the friction member wore.

Characteristics (1) In the wear-amount detecting mechanism 6, the wedge member 15 fits between the opposing member 16 attached to the roll pin 14 and the pressure plate 3 in a state in which the roll pin 14 attached to the pressure plate 3 is in contact with the flywheel. Additionally, when the friction member wears, the wedge member 15 moves in the first circumferential direction in accordance with the wear-amount of the friction member. That is, when the friction member wears, the wedge member moves in the first circumferential direction and is held in the state in which it fits between the opposing member 16 and the pressure plate 3. In this way, in the wear-amount detecting mechanism 6, the wedge member 15 can fit and be held between the opposing member 15 and the pressure plate 3 and be held with it being difficult for the wedge member 15 go out of position due to vibration or the like. Therefore, the wear-amount detecting mechanism 6 can be stably operated and wear compensation that is always accurate can be performed.

(2) In the wear-amount detecting mechanism 6, when the friction member wears, the pressure plate 3 moves in the direction away from the opposing member 16. Then, the wedge member 15 moves in the direction away from the opposing member 16 together with the pressure plate 3 and also moves in the first circumferential direction due to the biasing force of the first coil spring 17. In this way, when the friction member wears and the interstice W0 arises between the wedge member 15 and the opposing member 16, the wedge member 15 immediately fits between the opposing member 16 and the pressure plate in such a way that the interstice W0 goes away, so it becomes difficult for the wedge member 15 to be affected by vibration or the like and the wear-amount can be accurately detected.

(3) In the wear tracking mechanism 7, the fulcrum ring 4 is relatively rotated with respect to the pressure plate 3 by the second coil spring 28 only an amount corresponding to the amount of movement of the wedge member 15—that is, the wear-amount of the friction member. The fulcrum ring 4 and the pressure plate 3 are in contact at the sliding portions 10 and 11 including the sliding surfaces 10a and 11a, so when the fulcrum ring 4 is rotated with respect to the pressure plate 3, the fulcrum ring 4 moves to the side away from the pressure plate 3. Because of this, even when the friction member wears, the position at which the fulcrum ring 4 supports the diaphragm spring 5 does not change from the initial posture.

For this reason, the pressing load characteristic, and therefore the release load characteristic, can be maintained in the initial state.

(4) In the clutch cover assembly 1, the angle of inclination of the sloping surfaces 10a and 11a of the sliding portions 10 and 11 formed on the pressure plate 3 and the fulcrum ring 4 respectively is greater than the angle of inclination of the sloping surfaces 20a and 21a of the sliding portions 20 and 21 formed on the wedge member 15 and the opposing member 16 respectively. Therefore, the fulcrum ring 4 can be reliably regulated from moving in its former direction due to vibration or the like. Because of this, under-adjustment of the fulcrum ring 4 can be reliably prevented.

Other Embodiments

The present invention is not limited to the embodiment described above and is capable of a variety of modifications and improvements without departing from the scope of the present invention.

Figure 10:
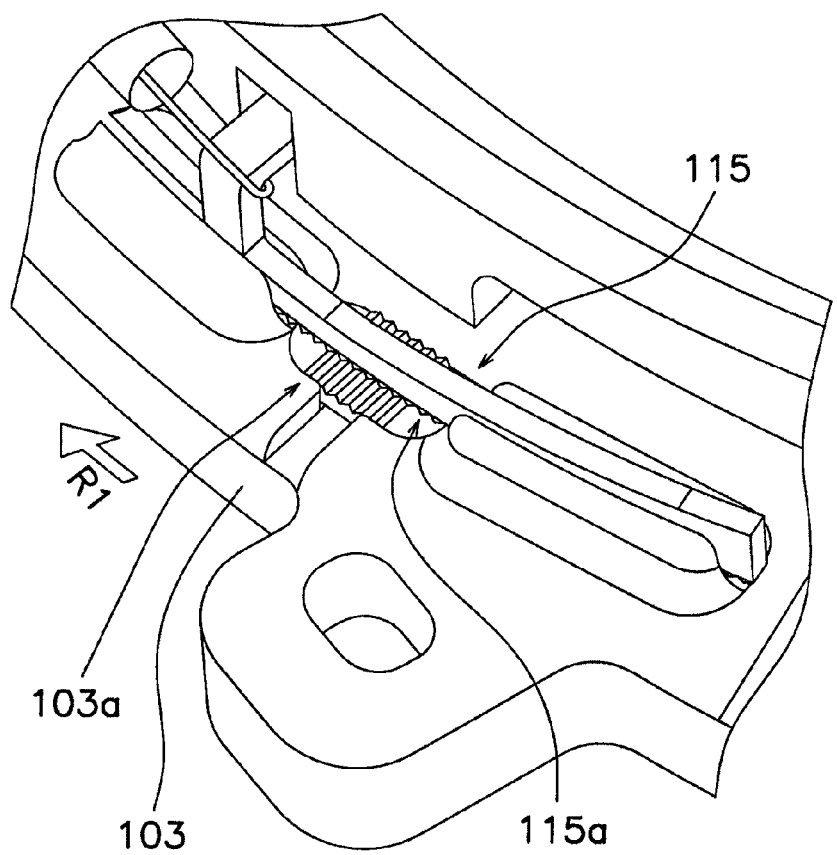
FIG. 10 is an enlarged perspective view of the wear-amount detecting mechanism excluding the opposing member (another embodiment).

(a) In the above embodiment, an example of a case where the wedge member 15 moves tracking the wear of the friction member was provided, but when the wear-amount of the friction member has reached a predetermined wear-amount, as shown in FIG. 10, a wedge member 115 can be configured to move in a stepwise manner. For example, as shown in FIG. 10, by disposing concavo-convex portions 115a and 103a that engage with each other on the wedge member 115 and a pressure plate 103 respectively, the wedge member 115 can be configured to move when the wear-amount of the friction member has reached a predetermined wear-amount.

In this case, when the wear-amount of the friction member has reached a predetermined wear-amount, such as the height of the concavo-convex portions 115a and 103a for example, the engagement between the concavo-convex portion 115a of the wedge member 115 and the concavo-convex portion 103a of the pressure plate 103 is released, and the concavo-convex portion 115a of the wedge member 115 engages with the concavo-convex portion 103a of the pressure plate 103 adjacent in the first circumferential direction (the direction of R1). In this way, in this embodiment, the concavo-convex portion 115a of the wedge member 115 engages with the concavo-convex portion 103a of the pressure plate 103 adjacent in the first circumferential direction. Therefore, the wedge member 115 can be held between the opposing member (not shown in FIG. 10) and the pressure plate 103, and the wedge member 115 can be regulated in such a way that it does not move in its former direction due to vibration or the like.

Here, description of sections whose configurations are the same as those of the above embodiment is omitted, and only description of sections whose configurations are different from those of the above embodiment is given. For this reason, effects that are the same as the effects described above can be obtained with the sections whose configurations are the same as those in the above embodiment.

(b) The configuration of the wear tracking mechanism can be any configuration provided that it is a configuration that acts in such a way as to maintain the initial posture of the diaphragm spring, and is not limited to the above embodiment.

EFFECTS OF INVENTION

In the present invention, in the wear-amount detecting mechanism, the wedge member moves in the circumferential direction in accordance with the wear-amount of the friction member and is held in the state in which it fits between the opposing member and the pressure plate, so the wear-amount detecting mechanism can be stably operated and wear compensation that is always accurate can be performed.

INDUSTRIAL APPLICABILITY

In the present invention, in the wear-amount detecting mechanism, the wedge member moves in the circumferential direction in accordance with the wear-amount of the friction member and can be held in the state in which it fits between the opposing member and the pressure plate, so the wear-amount detecting mechanism can be stably operated and wear compensation that is always accurate can be performed.

The invention claimed is:

1. A clutch cover assembly for pressing a friction member of a clutch disc assembly against a flywheel of an engine and releasing the pressing, the clutch cover assembly comprising:
   a clutch cover being fixed to the flywheel;
   a pressure plate being coupled to the clutch cover being relatively non-rotatable with respect to the clutch cover, and being configured to press the friction member against the flywheel;
   a pressing member being supported on the clutch cover and configured to press the pressure plate towards the flywheel;
   an wear-amount detecting mechanism including
      a contact member being attached to the pressure plate and being configured to be in contact with the flywheel,
      an opposing member being attached to the contact member and being configured to oppose the pressure plate, and
      a wedge member being configured to fit between the opposing member and the pressure plate, and to move in a circumferential direction in accordance with the wear-amount of the friction member; and
   a wear tracking mechanism being configured to move the pressing member in a direction of releasing the pressure in accordance with the amount of movement of the wedge member.

2. The clutch cover assembly according to claim 1, wherein the wear-amount detecting mechanism further includes a first biasing member,
   the first biasing member is configured to bias the wedge member in the circumferential direction,
   a sliding portion formed on the opposing member and a sliding portion formed on the wedge member, the opposing member sliding portion and the wedge member sliding portion being configured to be in contact with and be slidable against each other,
   a sloping surface formed on the opposing member sliding portion and a sloping surface formed on the wedge member sliding portion, the opposing member sloping surface and the wedge member sloping surface slope along the circumferential direction, and
   in a state in which the wedge member sloping surface makes contact with the opposing member sloping surface by the biasing force of the first biasing member, the first biasing member moves the wedge member in the circumferential direction in accordance with the wear-amount of the friction member.

3. The clutch cover assembly according to claim 2, wherein the wedge member maintains fitting with the opposing member by moving in a direction away from the opposing member together with the pressure plate in accordance with the wear-amount of the friction member and moving in the circumferential direction due to the first biasing member.

4. The clutch cover assembly according to claim 1, wherein the wear tracking mechanism includes
   a fulcrum ring being supported movably in an axial direction on the pressure plate and being configured to be pressed towards the pressure plate by the pressing member,
   a sliding portion formed on the pressure plate and a sliding portion formed on the fulcrum ring, the pressure plate sliding portion and the fulcrum ring sliding portion being configured to be in contact with and be slidable against each other, and
   a biasing member being configured to bias the fulcrum ring in the circumferential direction and relatively rotate the fulcrum ring with respect to the pressure plate,
   a sloping surface formed on the pressure plate sliding portion and a sloping surface formed on the fulcrum ring sliding portion, the pressure plate sloping surface and the fulcrum ring sloping surface slope along the circumferential direction, and
the biasing member moves the fulcrum ring in a direction away from the pressure plate by rotating the fulcrum ring in accordance with the amount of movement of the wedge member.

5. The clutch cover assembly according to claim 4, wherein
a sliding portion formed on the opposing member and a sliding portion formed on the wedge member, the opposing member sliding portion and the wedge member sliding portion being configured to be in contact with and be slidable against each other,
a sloping surface formed on the opposing member sliding portion and a sloping surface formed on the wedge member sliding portion, the opposing member sloping surface and the wedge member sloping surface slope along the circumferential direction, and
the pressure plate sloping surface and the fulcrum ring sloping surface are formed such that an angle of inclination of the pressure plate sloping surface and the fulcrum ring sloping surface is greater than an angle of inclination of the opposing member sloping surface and the wedge member sloping surface.

6. The clutch cover assembly according to claim 1, wherein concavo-convex portions engage with each other, wherein
   one of the concavo-convex portions is formed on the wedge member and the other is formed on the pressure plate, and
if the wear-amount of the friction member reaches a predetermined wear-amount, the engagement between the concavo-convex portion of the wedge member and the concavo-convex portion of the pressure plate is released and the concavo-convex portion of the wedge member engages with the concavo-convex portion of the pressure plate adjacent in the circumferential direction.

* * * * *